(12) United States Patent
Birkner et al.

(10) Patent No.: US 12,145,231 B2
(45) Date of Patent: Nov. 19, 2024

(54) DETECTION DEVICE FOR THE SEATING DETECTION OF AN OBJECT ON A CLAMPING DEVICE

(71) Applicant: MAG IAS GmbH, Eislingen (DE)

(72) Inventors: Tobias Birkner, Ebersbach (DE); Stephen Sorkalla, Uhingen (DE)

(73) Assignee: MAG IAS GMBH, Eislingen (DE)

( * ) Notice: Subject to any disclaimer, the term of this patent is extended or adjusted under 35 U.S.C. 154(b) by 607 days.

(21) Appl. No.: 17/293,614

(22) PCT Filed: Nov. 13, 2019

(86) PCT No.: PCT/EP2019/081097
§ 371 (c)(1),
(2) Date: May 13, 2021

(87) PCT Pub. No.: WO2020/099449
PCT Pub. Date: May 22, 2020

(65) Prior Publication Data
US 2022/0009048 A1    Jan. 13, 2022

(30) Foreign Application Priority Data
Nov. 14, 2018  (DE) .................. 10 2018 219 449.1

(51) Int. Cl.
*B23Q 17/00* (2006.01)
*G01B 13/12* (2006.01)

(52) U.S. Cl.
CPC ........... *B23Q 17/006* (2013.01); *G01B 13/12* (2013.01)

(58) Field of Classification Search
CPC .............................. B23Q 17/006; G01B 13/12

USPC .......................................................... 700/192
See application file for complete search history.

(56) References Cited

U.S. PATENT DOCUMENTS

| 8,126,587 B2 * | 2/2012 | Koo ................... H05K 13/0813 |
| | | 414/416.11 |
| 2010/0327503 A1 * | 12/2010 | Kawakami ............. B23Q 1/009 |
| | | 269/48.1 |
| 2014/0083203 A1 * | 3/2014 | Okamoto ............. B23Q 17/006 |
| | | 73/861.61 |
| 2016/0243662 A1 | 8/2016 | Suzuki et al. |
| 2017/0165761 A1 * | 6/2017 | Ishizu ................... B23B 31/001 |

(Continued)

FOREIGN PATENT DOCUMENTS

| DE | 4232630 A1 | 3/1994 |
| DE | 102006001740 A1 | 7/2007 |
| DE | 102008006776 A1 | 8/2009 |

(Continued)

*Primary Examiner* — Md Azad
(74) *Attorney, Agent, or Firm* — McGlew and Tuttle, P.C.

(57) ABSTRACT

A detection device for the seating detection of an object on a clamping device includes a measuring chamber with an inflow opening to supply a detection fluid from a pressure source, at least one outflow opening to discharge the detection fluid to a pressure sink and with at least one detection opening, which can be closed at least partially by the object abutting on the clamping device. An inflow resistance limits an inflow of the detection fluid via the inflow opening, at least one outflow resistance limits an outflow of the detection fluid via the at least one outflow opening and a pressure sensor determines a pressure of the detection fluid in the measuring chamber.

20 Claims, 2 Drawing Sheets

(56) References Cited

U.S. PATENT DOCUMENTS

Figure 1:
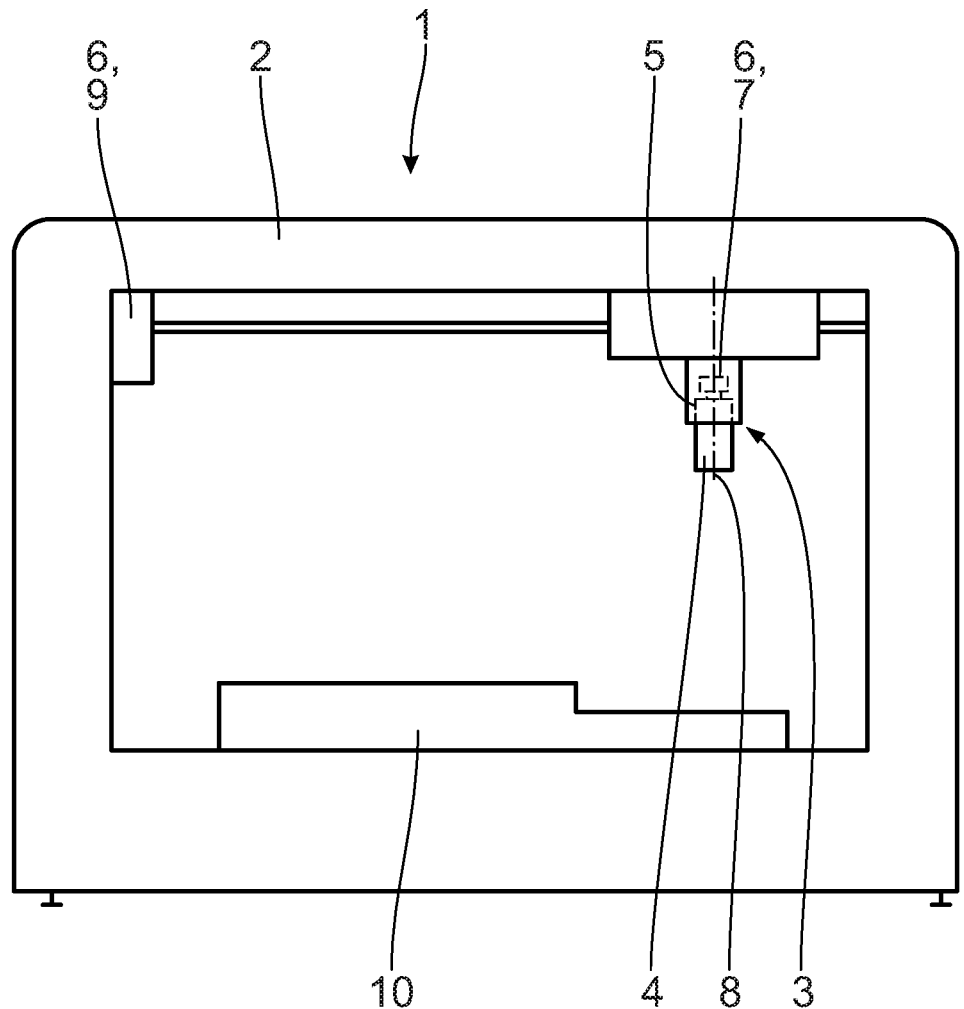

2018/0281083 A1* 10/2018 Yamauchi ................ B23Q 7/04

FOREIGN PATENT DOCUMENTS

| DE | 102014112819 A1 | 3/2016 |
| JP | 2006055975 A | 3/2006 |
| JP | 2017007027 A | 1/2017 |

* cited by examiner

DETECTION DEVICE FOR THE SEATING DETECTION OF AN OBJECT ON A CLAMPING DEVICE

CROSS-REFERENCES TO RELATED APPLICATIONS

This application claims the priority of the German Patent Application, Ser. No. DE 10 2018 219 449.1, filed Nov. 14, 2018, the content of which is incorporated herein by reference in its entirety as if fully set forth herein.

FIELD OF THE INVENTION

The invention relates to a detection device for the seating detection of an object on a clamping device. Furthermore, the invention relates to a clamping device for positioning and clamping an object comprising such a detection device as well as a machine tool comprising such a clamping device. The invention further relates to a process for the seating detection of an object on a clamping device.

BACKGROUND OF THE INVENTION

From DE 10 2014 112 819 A1, a machine tool is known having work spindle comprising face contact detection based on compressed air. In order to determine the clamping state of a tool on a clamping device, according to an alternative implementation, a pressure is detected on a nozzle branching from compressed air channels. Such face contact detection is complex with regard to the setup and has a high compressed air consumption.

From US 2016/0243662 A1, a machine tool is known having a clamping device comprising a detection device for the seating detection of an object on the clamping device. The detection device comprises a measuring chamber, an inflow resistance, an outflow resistance and a pressure sensor to determine a pressure within the measuring chamber. It is a drawback that filling the measuring chamber with detection fluid, in particular forming a stationary flow state necessary for seating detection, and thus the seating detection itself are very time-consuming.

Such detection devices are further known from JP 2017-007027 A and JP 2006-055975 A.

SUMMARY OF THE INVENTION

It is an object of the invention to provide a simple detection device for seating detection of an object on a clamping device, which can be operated in an efficient and reliable manner.

This object is achieved by a detection device for the seating detection of an object on a clamping device, comprising
a measuring chamber with
  an inflow opening to supply a detection fluid from a pressure source,
  at least one outflow opening to discharge the detection fluid to a pressure sink and
  at least one detection opening, which is at least partially closable by the object abutting on the clamping device,
an inflow resistance to limit an inflow of the detection fluid via the inflow opening,
at least one outflow resistance to limit an outflow of the detection fluid via the at least one outflow opening, and
a pressure sensor to determine a pressure of the detection fluid in the measuring chamber,
wherein the measuring chamber has a bypass opening to supply the detection fluid from the pressure source.

According to the invention, it has been found that the detection device has to have the at least one outflow resistance to limit the outflow of the detection fluid out of the measuring chamber and the inflow resistance to limit the inflow of the detection fluid into the measuring chamber in order to ensure an especially low consumption of compressed air. Due to the fact that the pressure sensor is construed or arranged such that it determines the pressure of the detection fluid in the measuring chamber, the operation of the detection device is especially robust and reliable. The formation of the measuring chamber including the bypass opening to supply the detection fluid from the pressure source ensures an operation of the detection device in an especially time-efficient manner. In particular, the measuring chamber can be filled particularly quickly via the bypass opening, which results in the fact that the time period necessary for seating detection may be especially short. Limiting the inflow and/or the outflow of the detection fluid is understood to mean that a volume flow of the detection fluid is reduced, however not entirely interrupted. The at least one outflow opening ensures the continuous outflow of the detection fluid out of the measuring chamber towards the pressure sink, in particular during the determining of the pressure. Advantageously, this leads to the fact that the determining of the pressure in the measuring chamber cannot exclusively take place within a predetermined time frame of a measuring cycle, but can take place continuously. The seating detection therefore can be carried out in an especially time-efficient manner. Furthermore, the pressure of the detection fluid can be determined over a pre-determined period of time in order to avoid measuring errors, which allows for the seating state of the tool to be detected in an especially reliable manner. In particular, the function of the detection device as far as possible is independent from leakage, in particular in the area of the measuring chamber. The detection device is especially resistant to interference. By means of the inflow resistance, the inflow necessary for the seating detection can be strongly reduced. The compressed air consumption of the detection device thus is particularly low and the detection device can be operated in an energy-efficient manner. Further, no inflow valve is needed. A time-consuming switching of the detection device by operating the inflow valve is omitted.

Preferably, a bypass line to connect the bypass opening with the pressure source is construed without any flow resistance. This is to be understood such that the bypass line has a flow resistance which is significantly, in particular at least ten times, in particular at least a hundred times, in particular at least five hundred times, in particular at least a thousand times, lower than the inflow resistance.

According to one aspect of the invention, the cross-sectional area of the bypass opening and/or the bypass line, in particular an average cross-sectional area along the entire length of the bypass line, in relation to a cross-sectional area of the inflow opening and/or the inflow resistance and/or the outflow resistance is at least twice, in particular at least four times, in particular at least five times, in particular at least ten times as large. Preferably, the bypass line connects the measuring chamber in a fluid-conducting manner with the pressure source which also the inflow opening is connected to for supplying the detection fluid.

The object can be a tool or a workpiece. Preferably, the clamping device is construed for reversible clamping with the object. The object can have a flat abutting surface to at least partially close the at least one detection opening.

The measuring chamber may be limited by a detection housing. Preferably, the measuring chamber is construed in the form of at least one fluid line. The measuring chamber may also have a pressure reservoir. In particular, the measuring chamber may be construed in the form of the fluid lines extending between the inflow opening, the at least one outflow opening and the detection opening. The detection device thus can be produced in an especially economic manner.

The inflow resistance and/or the at least one outflow resistance is to be understood to mean a flow resistance which is significantly, in particular at least ten times, in particular at least a hundred times, in particular at least five hundred times, in particular at least a thousand times higher than a flow resistance of the measuring chamber and/or of the fluid lines, in particular of the fluid lines to connect the inflow opening with the pressure source and/or to connect the at least one outflow opening with the pressure sink. The inflow resistance and/or the outflow resistance can be construed as a tapering of a cross-section in relation to the at least one fluid line and/or as a grid, in particular as a throttle valve.

The pressure sink preferably is formed by a surrounding area of the detection device. A pressure in the pressure sink as a result preferably corresponds to the surrounding pressure.

Preferably, the detection fluid comprises a gas, in particular compressed air, and/or a fluid, in particular water and/or a coolant and/or a lubricant and/or an emulsion and/or glycol. The pressure source can be a central compressed air supply. The detection fluid composed of compressed air is especially easy to handle.

According to a further aspect of the invention, the detection device has the pressure source. In particular, the detection device can have a pump, in particular a compressor, to provide the pressure at the pressure source. Thus, the detection device is independent from additional peripheral components.

Preferably, a fluid line to connect the inflow opening with the pressure source is construed in an interruption-free, in particular stop-valve-free manner. Preferably, a fluid line to connect the at least one outflow opening with the pressure sink is construed in an interruption-free, in particular stop-valve-free manner. The detection device thus can be produced in an especially economic manner.

The inflow of the detection fluid into the measuring chamber can be completely interrupted by means of an inflow valve. The inflow valve can have an inflow valve drive to automatically displace the inflow valve between an open position and a closed position. Advantageously, this results in the fact that the detection device only requires compressed air during the seating detection procedure. The detection device thus can be operated in an especially economic manner.

A detection device comprising an inflow pressure sensor arranged upstream of the inflow resistance ensures an especially reliable seating detection procedure. Due to the fact that an inflow pressure sensor is arranged upstream of the inflow resistance, pressure fluctuations of the inflowing detection fluid or of the pressure source can be determined. Knowing these pressure fluctuations allows for considering these during the seating detection procedure.

A detection device, in which the measuring chamber is formed by a basic housing and a clamping housing which is displaceable in relation to the basic housing, wherein the inflow opening is arranged on the basic housing and wherein the detection opening is arranged on the clamping housing, can be applied in an especially flexible manner. The clamping housing can be arranged in relation to the basic housing in a pivotable manner around at least one, in particular at least two, in particular three, axes and/or in a displaceable manner along at least one, in particular at least two, in particular at least three, axes. The clamping housing can be construed as a rotatable head of a work spindle. The basic housing correspondingly can be construed as a stationary part of the work spindle.

The detection device can have at least one seating seal for reversible sealing of the bearing gab between the basic housing and the clamping housing. Preferably, the seating seal can be operated by means of the detection fluid. The seating seal preferably has a closed position in which same contacts both the basic housing and the clamping housing in a sealing manner, and an open position in which same is arranged in relation to the basic housing and/or the clamping housing without any contact. The detection device thus is especially wear-resistant.

A detection device, in which the at least one outflow opening is formed between the basic housing and the clamping housing, can be produced in an economic manner and can be operated in an especially reliable manner.

Preferably, the outflow resistance of the at least one outflow opening formed between the housing and the clamping housing is formed by a bearing gap between the basic housing and the clamping housing. A complete sealing of a bearing gab between the basic housing and the clamping housing therefore is not necessary for the seating detection. A cost-intensive seating seal can be omitted.

A detection device, in which the at least one outflow resistance is construed as a labyrinth seal between the basic housing and the clamping housing, can be operated in an especially energy-efficient and time-efficient manner The labyrinth seal preferably is formed to seal the clamping housing against the basic housing. The detection device preferably comprises at least two labyrinth seals to seal the measuring chamber extending along the bearing gap on both sides. Due to the fact that the labyrinth seal is construed without any contact, the detection device is especially wear-resistant. The outflow of the detection fluid out of the measuring chamber into the pressure sink can be significantly reduced by the labyrinth seal. In particular, the labyrinth seal allows for the seating detection during the displacement of the clamping housing in relation to the basic housing. Downtimes therefore can be avoided.

A detection device, in which the at least one outflow resistance is adjustable, can be operated in an especially reliable manner. The at least one outflow resistance can be construed as an adjustable throttle valve, which in particular can be operated pneumatically and/or electrically and/or manually. In particular, the at least one outflow resistance can be construed to limit the outflow of the detection fluid depending on the temperature. Due to the fact that the at least one outflow resistance is adjustable, a pressure of the detection fluid in the measuring chamber can be adjusted such that the pressure sensor works within its linear measuring range. In particular, temperature fluctuations within the measuring chamber and/or pressure fluctuations of the inflowing detection fluid can be compensated.

A detection device comprising a bypass valve to reversibly interrupt an inflow of the detection fluid via the bypass opening can be operated in an especially time-efficient manner. Preferably, the bypass valve has a valve drive to displace the bypass valve between an open position and a closed position. The bypass valve thus can be displaced between the open position and the closed position in an automated manner. For filling the measuring chamber, the bypass line and/or the bypass valve can have a flow resistance which is, in particular at least five times, in particular at least ten times, in particular at least twenty times, lower than the flow resistance of the measuring chamber. During the seating detection, the bypass valve can be closed for increasing the measurement accuracy.

A detection device comprising a control unit, which has a signal connection with the pressure sensor in order to determine a state of positioning of the object on the clamping device, can be operated in an especially efficient manner and can be automated. In order to determine a detection pressure of the detection fluid in the measuring chamber, the control unit has a signal connection with the pressure sensor. The control unit can be construed to determine a pressure change based on the detection pressure. Preferably, the control unit is construed to compare the pressure change with a pressure change limit value and/or the detection pressure with a detection pressure limit value. The control unit preferably is construed such that a faulty state of positioning is detected if the detection pressure is lower than the detection pressure limit value. Preferably, the control unit is construed to determine the state of positioning only when the pressure change is smaller than the pressure change limit value. Advantageously, due to this it can be achieved that the state of positioning is determined only when an utmost stationary detection pressure has been reached within the measuring chamber.

According to one further aspect of the invention, the control unit can be construed such that the state of positioning is determined on the basis of the pressure change. In particular, the control unit can be construed to determine the state of positioning before a stationary state of the pressure has been reached. For doing so, the control unit can compare the pressure change value with a target pressure change value and/or a, in particular temporal, pressure change history with a target pressure change history. Preferably, a faulty positioning of the object is determined when the pressure change value is lower than the target pressure change value and/or when the pressure change history surpasses a pre-determined limit deviation in relation to a target pressure change history. In order to determine the state of positioning, the control unit can also be construed to determine a time coefficient of the pressure change. Determining the state of positioning can thus be carried out in an especially time-saving manner.

According to one aspect of the invention, the control unit has a signal connection with the inflow pressure sensor and/or a temperature sensor and/or a motion sensor. The temperature sensor preferably is construed to determine a temperature of the detection fluid in the measuring chamber. The motion sensor can be construed as a rotary sensor to determine a rotary motion of the clamping housing in relation to the basic housing. The control unit can be construed to determine the state of positioning on the basis of a signal from the inflow pressure sensor and/or from the temperature sensor and/or from the motion sensor. In particular, by means of the control unit, the outflow resistance of the labyrinth seal, which is dependent on motion, can be derived via the rotary movement. The state of positioning thus can be determined in an especially reliable manner.

A detection device, in which, in order to control the inflow resistance and/or the at least one outflow resistance and/or a bypass valve and/or an inflow valve, the control unit has a signal connection with each of them, can be operated in an especially energy-efficient manner and can be automated. The inflow valve can be construed to entirely close the inflow of the detection fluid. Due to the fact that the control unit has a signal connection with the inflow valve, the supply of compressed air can be limited to the period of the seating detection. In particular, the control unit can be construed to adjust the outflow resistance and/or the inflow resistance depending on a signal from the temperature sensor and/or from the motion sensor. The pressure sensor thus can be operated in its linear measuring range, with the result that the seating detection can be carried out in an especially reliable and precise manner.

It is one further object of the invention to provide a clamping device for positioning and clamping the object, which can be operated in an especially energy-efficient and time-efficient manner.

This object is achieved by a clamping device for positioning and clamping an object with
a detection device according to the invention and
a contact body to clamp with the object,
wherein the at least one detection opening is arranged on the contact body.

The advantages of the clamping device according to the invention correspond to the advantages of the detection device described above. The contact body to clamp with the object can be formed by the clamping housing. According to one aspect of the invention, the clamping device has at least one clamping element to provoke a clamping force between the object and the contact body. The detection opening can be construed as a bore and/or as a, in particular annular, groove in the contact body. The contact body can have a sealing element. Preferably, the sealing element is construed such that in case of a faultless contact of the object on the clamping device, it interacts with the object in order to close the detection opening entirely.

It is further an object of the invention to provide an improved machine tool.

This object is achieved by a machine tool with
a machine frame,
a clamping device according to the invention and
a drive device to displace the contact body in relation to the machine frame.

The advantages of the machine tool according to the invention correspond to the advantages of the clamping device described above as well as the detection device described above. The machine tool can be construed as a multi-axis machine. The drive device can be construed for rotatory and/or translational displacement of the drive body in relation to the machine frame. Preferably, the drive device is construed such that the contact body can be displaced about at least one, in particular at least two, in particular at least three rotational axes and/or along at least one, in particular at least two, in particular at least three directions of displacement in relation to the machine frame. The drive device can comprise a spindle drive for rotatory displacement of the contact body in relation to the machine frame. According to one aspect of the invention, the machine tool has a machine control for controlling. Advantageously, this results in the fact that an operation of the machine tool can be started or interrupted depending on the state of positioning.

The invention further has the object to provide a process for the seating detection of an object on a clamping device, which can be carried out in an especially energy-efficient and time-efficient manner and allows for a detection of a faulty state of positioning in a reliable manner.

This object is achieved by a process for the seating detection of an object on a clamping device, comprising the steps of:

providing a detection device according to the invention,
determining the pressure of the detection fluid in the measuring chamber by means of the pressure sensor, wherein during the determining of the pressure the detection fluid continuously flows out of the measuring chamber via the at least one outflow opening, and
determining a state of positioning on the basis of the pressure.

The advantages of the process according to the invention correspond to the advantages of the machine tool described above, of the clamping device as well as of the detection device. Preferably, the state of positioning is determined on the basis of a signal from the inflow pressure sensor and/or from the temperature sensor and/or from the motion sensor. The outflow resistance preferably is adjusted on the basis of a signal from the inflow pressure sensor and/or from the temperature sensor and/or from the motion sensor.

According to one aspect of the invention, the operation of the machine tool, in particular of the drive device, is started and/or interrupted and/or limited depending on the state of positioning.

A process comprising a displacement of the at least one detection opening in relation to the inflow opening during the determining of the pressure is especially time-efficient and can be carried out in a flexible manner. In particular, the displacement of the at least one detection opening in relation to the inflow opening comprises a rotary motion. Preferably, the seat-ing detection takes place during the displacement of the at least one de-tection opening in relation to the inflow opening. Downtimes for detecting the seating of the object on the clamping device therefore can be avoided.

A process comprising a determination of the state of positioning in dependence on a measuring temperature and/or a relative movement between the detection opening and the inflow opening ensures an especially reliable detection of the seating of the object on the clamping device. The measuring temperature preferably is determined as a temperature of the detection fluid in the measuring chamber. Due to the fact that the determined pressure may vary depending on the measuring temperature and/or on the relative movement, considering the measuring temperature and/or the relative movement during the seating detection leads to an especially reliable detection result.

A process comprising an adjustment of the at least one outflow resistance depending on a measuring temperature and/or a relative movement between the detection opening and the inflow opening ensures the seating detection in an especially reliable manner. Due to adjusting the outflow resistance depending on the measuring temperature and/or the relative movement, interferences on the pressure of the detection fluid in the measuring chamber can be reduced.

A process comprising a filling of the measuring chamber with the detection fluid via a bypass line, closing the bypass line and determining the pressure when the bypass line is closed can be carried out in an especially time-efficient manner. Preferably, the detection fluid is fed into the measuring chamber via the inflow opening and additionally via a bypass opening separate from the inflow opening and/or the outflow opening. Due to the additional filling of the measuring chamber via the bypass opening, the pressure required for the seating detection can be reached especially quickly in the measuring chamber. The bypass line connected with the bypass opening preferably is closed after the measuring chamber has been filled. In doing so it is achieved that the pressure within the measuring chamber reacts especially sensitively to an outflow of the detection fluid via the detection opening. Correspondingly, determining the pressure is carried out when the bypass line is closed.

A process, in which the determination of the state of positioning is carried out during a pressure change within the measuring chamber, can be implemented in an especially time-efficient manner. Due to the fact that the state of positioning is determined during the pressure change within the measuring chamber, a waiting time can be avoided while the measuring chamber is filled with the detection fluid until a largely stationary pressure has developed. In order to determine the state of positioning, a pressure change and/or a pressure history and/or a time coefficient of the pressure change can be identified. In particular, on the basis of the pressure history, a developing converging pressure value can be calculated in advance. Due to the fact that waiting times can be avoided, the seating detection can be carried out in an especially time-saving manner and the machine tool can be operated in an especially efficient manner.

Further features, advantages and details of the invention follow from the description of an embodiment given below.

BRIEF DESCRIPTION OF THE4 DRAWING

Figure 2:
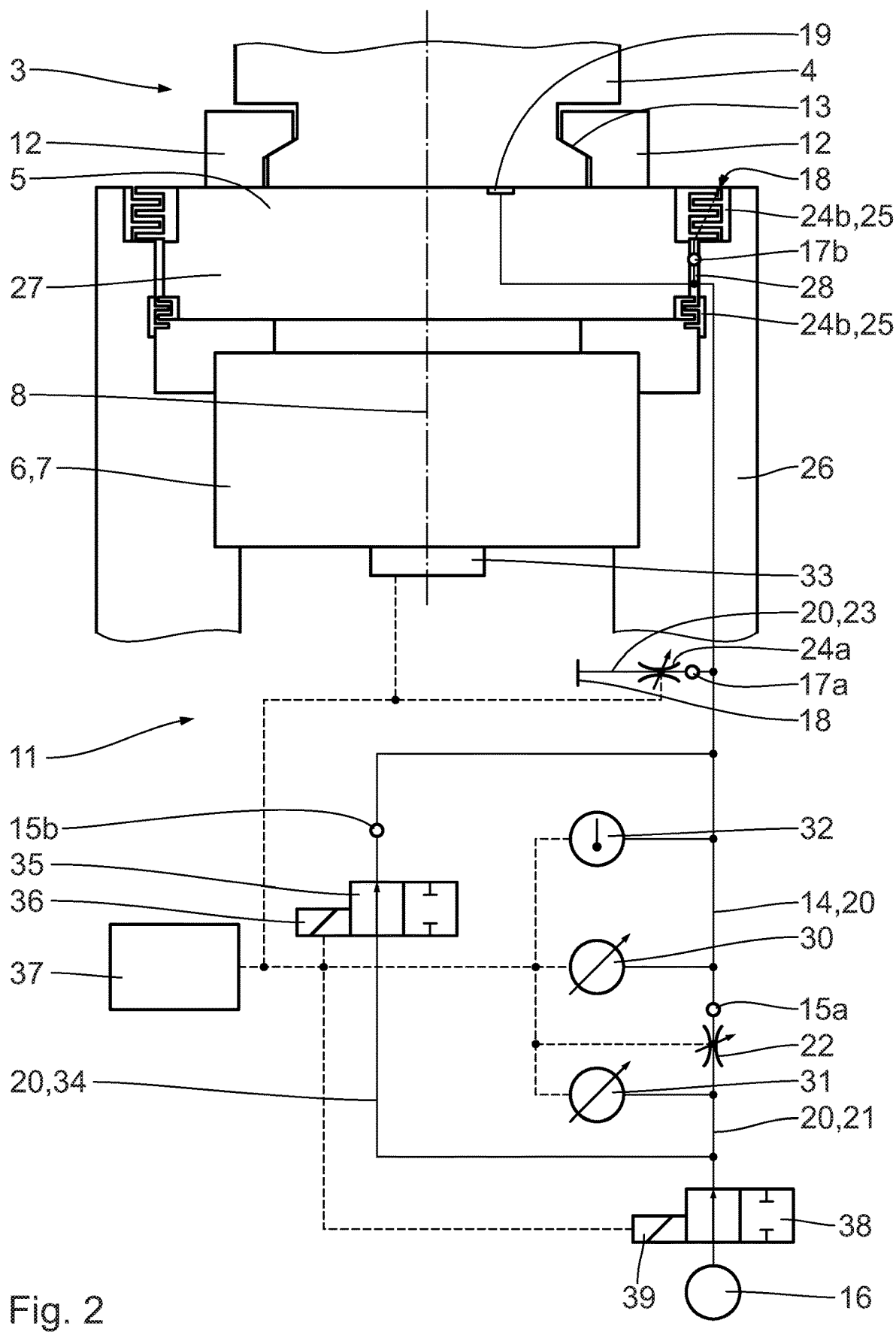

FIG. 1 shows a schematic view of a machine tool comprising a machine frame, a clamping device and a drive device to displace a contact body of the clamping device in relation to the machine frame and FIG. 2 shows a schematic view of the clamping device in FIG. 1, wherein the clamping device has the contact body to clamp with an object and a detection device, and wherein a detection opening of the detection device arranged on the contact body is entirely closed by the object.

DESCRIPTION OF THE PREFERRED EMBODIMENT

In FIG. 1, a machine tool 1 with a machine frame 2 and a clamping device 3 is shown. The clamping device 3 is construed for positioning and clamping an object 4. For clamping with the object 4, the clamping device 3 has a contact body 5.

The machine tool 1 comprises a drive device 6 to displace the contact body 5 in relation to the machine frame 2. For rotationally driving the object 4, the drive device 6 comprises a spindle drive 7. By means of the spindle drive 7, the object 4 can be displaced about a rotational axis 8. The drive device 6 has a linear drive 9 to displace the contact body 5 in relation to the machine frame 2. The machine tool 1 is construed to process a workpiece 10 by means of the object 4.

In FIG. 2, the clamping device 3 is shown in further detail. The clamping device 3 is construed for positioning and clamping the object 4. The clamping device 3 comprises a detection device 11 for the seating detection of the object 4 and the clamping device 3. In order to provide a clamping force working between the object 4 and the contact body 5, the clamping device 3 has a plurality of clamping elements 12. The clamping elements 12 are arranged in a radial direction to the rotational axis 8 in a displaceable manner on the contact body 5. The clamping elements 12 interact with the object 4, via one clamping surface 13 each. The clamping surface 13 is construed to apply a clamping force which, due to a radial displacement in relation to the rotational axis 8, works along the rotational axis 8 onto the object 4.

The detection device 11 has a measuring chamber 14. The measuring chamber 14 comprises two inflow openings 15a, 15b to supply a detection fluid from a pressure source 16.

The pressure source 16 is construed as a compressed air source. Further, the measuring chamber 14 comprises two outflow openings 17a, 17b to discharge the detection fluid to a pressure sink 18. The pressure sink 18 is formed by a surrounding of the detection device 11, in particular by an inner space of the machine frame 2. The measuring chamber 14 further comprises a detection opening 19, which is arranged on the contact body 5. The detection opening 19 can be at least partially closed by the object 4 abutting on the contact body 5.

The detection device 11 has fluid lines 20 to guide compressed air. The measuring chamber 14 is formed by the fluid lines 20 provided between the inflow openings 15a, 15b, the outflow openings 17a, 17b and the detection opening 19.

The first inflow opening 15a is arranged on a detection line 21. Between the first inflow opening 15a and the pressure source 16, in particular on the detection line 21, an inflow resistance 22 is arranged. The inflow resistance 22 is construed to limit an inflow of the detection fluid via the inflow opening 15a. The inflow resistance 22 is construed as an adjustable throttle valve.

The first outflow opening 17a has a fluid-conducting connection with the pressure sink 18 via a reduction line 23. In order to limit an outflow of the detection fluid via the first outflow opening 17a, a first outflow resistance 24a is arranged between the latter and the pressure sink 18. The first outflow resistance 24a is adjustable. In particular, the first outflow resistance 24a is construed as an adjustable throttle valve.

The second outflow opening 17b has a fluid-conducting connection with the pressure sink 18 via a second outflow resistance 24b. The second outflow resistance 24b is construed as a labyrinth seal 25.

The labyrinth seal 25 is arranged between a basic housing 26 and a clamping housing 27. The clamping housing 27 is connected with the contact body 5 in a non-rotatable manner. In particular, the contact body 5 is formed by the clamping housing 27. The basic housing 26 is connected with the machine frame 2 in a non-rotatable manner.

The measuring chamber 14 spans a bearing gap 28 between the basic housing 26 and the clamping housing 27. The labyrinth seal 25 is construed to seal the measuring chamber 14 in the area of the bearing gap 28 against the pressure sink 18, in particular against the environment.

The detection device 11 has a pressure sensor 30, which has a fluid-conducting connection with the measuring chamber 14. Further, the detection device 11 comprises an inflow pressure sensor 31 to determine a pressure of the detection fluid upstream of the inflow resistance 22. The inflow pressure sensor 31 is arranged in front of the inflow resistance 22 on the detection line 21.

The detection device 11 has a temperature sensor 32 to determine a temperature of the detection fluid in the measuring chamber 14. On the spindle drive 7, a rotary sensor 33 is arranged to determine a rotary motion, in particular a rotation number, of the contact body 5 in relation to the machine frame 2.

The second inflow opening 15b is connected with the pressure source 16 via a bypass line 34 in a fluid-conducting manner. The second inflow opening 15b is also designated as bypass opening. For reversibly closing the bypass line 34, a bypass valve 35 is arranged thereon. For automatically switching the bypass valve 35 between an open position and a closed position, the bypass valve 35 has a valve drive 36.

The detection device 11 has a control unit 37. The control unit 37 has a signal connection with the pressure sensor 30, the inflow pressure sensor 31, the temperature sensor 32 and the rotary sensor 33. Further, the control unit 37 has a signal connection with the first outflow resistance 24a, the inflow resistance 22 and the valve drive 36. The control unit 37 is construed to determine a state of positioning of the object 4 on the contact body 5 on the basis of a signal from the pressure sensor 30. Further, the control unit 37 is construed to determine the state of positioning on the basis of a rotary motion determined by the rotary sensor 33, on the basis of a temperature determined by the temperature sensor 32 and on the basis of a pressure determined by the inflow pressure sensor 31. In order to displace the bypass valve 35 between the open position and the closed position, the control unit 37 has a signal connection with the valve drive 36. Further, the control unit 37 is construed to adjust the inflow resistance 22 and the first outflow resistance 24a on the basis of the pressure determined by the pressure sensor 30.

The detection device 11 has an inflow valve 38 to reversibly close off the inflow of the detection fluid from the pressure source 16. The inflow valve 38 comprises an inflow valve drive 39. The inflow valve drive 39 has a signal connection with the control unit 37.

The operating principle of the machine tool 1 or the clamping device 3 or the detection device 11 for the seating detection of the object 4 on the clamping device 3 is as follows:

The machine tool 1 is situated in a basic position. The clamping device 3 is mounted to the machine frame 2, wherein the detection opening 19 is open towards an inner space of the machine frame 2. The spindle drive 7 is deactivated. The bypass valve 35 is situated in the closed position. The detection opening 19 is connected with the pressure source 16 via the measuring chamber 14, the first inflow opening 15a and the inflow resistance 22 and the inflow valve 38. The inflow valve 38 is situated in a closed position.

By means of a signal from the control unit 37, the inflow valve drive 39 is activated and the inflow valve 38 is displaced out of the closed position into an open position. Limited by the inflow resistance 22, detection fluid in the form of compressed air continuously flows into the measuring chamber 14 and flows out of same via the detection opening 19 into the pressure sink 18 formed by the inner space of the machine frame 2. Additionally, compressed air flows out of the measuring chamber 14 via the labyrinth seal 25 and the second outflow resistance 24a into the pressure sink 18.

The pressure sensor 30 and the inflow pressure sensor 31 each determine a pressure of the detection fluid. The inflow resistance 22 is adjusted by means of the control unit 37 such that the pressure acting on the pressure sensor 30 is within the linear measuring range of the pressure sensor 30. During the detection process described in the following, the inflow resistance 22 is adjusted by the control unit 37 on the basis of a signal from the inflow pressure sensor 31 such that low frequency pressure fluctuations of the inflowing detection fluid are compensated.

The pressure in the measuring chamber 14 is lower than the pressure in the pressure source 16 and higher than a pressure prevailing in the pressure sink 18.

The object 4 is connected with the clamping device 3. For this purpose, the object 4 is brought close to the contact body 5. The clamping elements 12 are brought close to the workpiece 4 in a radial direction to the rotational axis 8, which results in the object 4 being clamped with the contact body 5 along the rotational axis 8. In a first state of positioning, the object 4 entirely and faultlessly abuts on the contact body 5. In doing so, the object 4 entirely closes the detection opening 19. By means of the control unit 37, a pressure increase at the pressure sensor 30 is determined. The control unit 37 provides a signal to the valve drive 36 to open the bypass valve 35. The bypass valve 35 is opened. Via the bypass valve 35 and the second bypass opening 15*b*, the detection fluid flows into the measuring chamber 14. A fluid flow supplied via the bypass opening 15*b* into the measuring chamber 14 is bigger than a fluid flow supplied via the inflow opening 15*a* into the measuring chamber 14. Via the bypass line 34, the measuring chamber 14 can be filled especially quickly with the detection fluid.

The control unit 37 compares a detection pressure acting on the pressure sensor 30 with a filling pressure limit value. As soon as the detection pressure exceeds the filling pressure limit value, the control unit 37 provides a signal to the valve drive 36 to close the bypass valve 35. The valve drive 36 displaces the bypass valve from the open position into the closed position.

The control unit 37 determines a pressure change on the pressure sensor 30. The control unit 37 compares the pressure change with a pressure change limit value. As soon as the pressure change falls below the pressure change limit value, the detection pressure required for the seating detection is determined in the measuring chamber 14 by means of the pressure sensor 30.

The control unit 37 compares the detection pressure with a detection pressure limit value. A state of positioning of the object 4 on the clamping device 3 is determined depending on a difference between the detection pressure and the detection pressure limit value. Since the object 4 faultlessly abuts on the contact body 5, the detection pressure is higher than the detection pressure limit value. The control unit 37 detects the faultless seating of the object 4 on the clamping device 3. The control unit 37 provides a signal to a machine control, which is not shown, of the machine tool 1, which signal correlates with the faultless state of positioning. The spindle drive 7 is activated and the workpiece 10 is processed by means of the object 4.

During the processing of workpieces 10, the clamping device 3 is subject to impurities. Impurities, in particular material removed from the workpiece 10, can get onto the contact body 5. For example, a chip can get between the contact body 5 and the object 4. The object 4 is then faultily positioned on the clamping device 3. Alternatively, it is possible that the clamping elements 12, due to a malfunction, cannot provide the required pressure force between the object 4 and the contact body 5. The object 4 can then shift into a faulty second state of positioning during the clamping procedure.

The faulty state of positioning results in the detection opening 19 not being entirely closed by the object 4. Due to the fact that the detection fluid additionally can flow out of the measuring chamber 14 via the detection opening 19, the pressure of the detection fluid in the measuring chamber 14 is reduced. In particular, the detection pressure in case of the faulty state of positioning is lower than in case of the faultless state of positioning.

The detection pressure again is determined by the control unit 37 when the pressure change falls below the pressure change limit value. The detection pressure is compared with the detection limit pressure. Since the developing detection pressure, due to the leakage between the object 4 and the contact body 5, is lower than the detection pressure limit value, the faulty state of positioning is detected. At the machine control, the control unit 37 provides a signal correlating with the faulty state of positioning. The start of operation of the machine tool, in particular the processing of the workpiece 10 is blocked. An alarm signal is issued to an operator by the machine control.

Due to the fact that the bearing gap 28 between the basic housing 26 and the clamping housing 27 is sealed by means of the labyrinth seal 25, determining the state of positioning can therefore take place during the displacement of the contact body 5 in relation to the machine frame 2 during the operation of the machine tool 1. In particular, the determination of the state of positioning can take place during the displacement of the detection opening 19 in relation to the inflow opening 15*a*. The second outflow resistance 24*b* of the labyrinth seal 25 is dependent on a movement of the clamping housing 27 in relation to the basic housing 26. This relative movement is determined by means of the rotary sensor 33. The first outflow resistance 24*a* is adjusted by means of the control unit 37 on the basis of a signal from the rotary sensor 33. The first outflow resistance 24*a* is adjusted such that a total outflow resistance between the measuring chamber 14 and the pressure sink 18, via the first outflow resistance 24*a* and the second outflow resistance 24*b*, remains constant.

The control unit 37 determines the state of positioning considering the temperature of the detection fluid in the measuring chamber 14, determined by the temperature sensor 32. In particular, the first outflow resistance 24*a* is adjusted on the basis of the temperature in the measuring chamber 14. The properties of the detection fluid changing along with the temperature are considered when the control unit 37 determines the state of positioning.

Due to the formation of the measuring chamber 14 with the inflow opening and the at least one outflow opening, wherein an inflow resistance 22 is provided to limit the inflow of the detection fluid, and wherein the outflow resistances 24*a*, 24*b* are provided to limit the outflow of the detection fluid, the seating detection of the object 4 on the clamping device 3 can be carried out in an especially reliable and energy-efficient manner. Due to the fact that the second outflow resistance 24*b* is construed as a labyrinth seal 25, a cost-intensive seating seal, which is susceptible to wear and can be displaced only incurring an increased timely effort, can be omitted. The adjustable inflow resistance 22 allows for the compensation of pressure fluctuations. The bypass line 34, together with the bypass valve 35, ensures an especially time-efficient seating detection of the workpiece 4 on the clamping device 3.

The invention claimed is:

1. A detection device for the seating detection of an object on a clamping device, the detection device comprising:
   a measuring chamber with an inflow opening to supply a detection fluid from a pressure source into the measuring chamber, at least one outflow opening to discharge the detection fluid from the measuring chamber to a pressure sink and at least one detection opening, which is at least partially closable by the object abutting on the clamping device,
   an inflow resistance to limit an inflow of the detection fluid via the inflow opening,
   at least one outflow resistance to limit an outflow of the detection fluid via the at least one outflow opening, and
   a pressure sensor to determine a pressure of the detection fluid in the measuring chamber, wherein the measuring chamber has a bypass opening to supply the detection fluid from the pressure source into the measuring chamber, wherein the detection device comprises a bypass line configured to connect the bypass opening with the pressure source, wherein the bypass line has a flow resistance which is at least ten times lower than the inflow resistance, and wherein the detection device comprises a bypass valve configured to reversibly interrupt an inflow of the detection fluid via the bypass opening.

2. The detection device according to claim 1, further comprising an inflow pressure sensor arranged upstream of the inflow resistance.

3. The detection device according to claim 1, wherein the measuring chamber is formed by a basic housing and a clamping housing which is displaceable in relation to the basic housing, wherein the inflow opening is arranged on the basic housing and wherein the detection opening is arranged on the clamping housing.

4. The detection device ac cording to claim 3, wherein the at least one outflow opening is formed between the basic housing and the clamping housing.

5. The detection device according to claim 3, wherein the at least one outflow resistance is configured as a labyrinth seal between the basic housing and the clamping housing.

6. The detection device according to claim 1, wherein the at least one outflow resistance is adjustable.

7. The detection device according to claim 1, further comprising a control unit, which has a signal connection with the pressure sensor in order to determine a state of positioning of the object on the clamping device.

8. The detection device according to claim 7, wherein in order to control at least one of the inflow resistance and the at least one outflow resistance and a bypass valve and an inflow valve, the control unit has a signal connection with each of them.

9. A clamping device for positioning and clamping an object, the clamping device comprising:
 a detection device for seating detection of an object on a clamping device, the detection device comprising:
  a measuring chamber with an inflow opening to supply a detection fluid from a pressure source into the measuring chamber, at least one outflow opening to discharge the detection fluid from the measuring chamber to a pressure sink, at least one detection opening, which is at least partially closable by the object abutting on the clamping device and a bypass opening to supply the detection fluid from the pressure source into the measuring chamber, wherein the detection device comprises a bypass line configured to connect the bypass opening with the pressure source, wherein the bypass line has a flow resistance which is at least ten times lower than the inflow resistance, and wherein the detection device comprises a bypass valve configured to reversibly interrupt an inflow of the detection fluid via the bypass opening;
  an inflow resistance to limit an inflow of the detection fluid via the inflow opening;
  at least one outflow resistance to limit an outflow of the detection fluid via the at least one outflow opening, and
  a pressure sensor to determine a pressure of the detection fluid in the measuring chamber; and
 a contact body to clamp with the object, wherein the at least one detection opening is arranged on the contact body, wherein the measuring chamber is formed by a basic housing and a clamping housing which is displaceable in relation to the basic housing, and wherein the at least one outflow resistance is formed by a bearing gap between the basic housing and the clamping housing.

10. A machine tool, comprising:
 a machine frame;
 a clamping device for positioning and clamping an object, the clamping device comprising:
  a detection device for seating detection of an object on a clamping device, the detection device comprising:
   a measuring chamber with an inflow opening to supply a detection fluid from a pressure source into the measuring chamber, at least one outflow opening to discharge the detection fluid from the measuring chamber to a pressure sink, at least one detection opening, which is at least partially closable by the object abutting on the clamping device and a bypass opening to supply the detection fluid from the pressure source into the measuring chamber, wherein the detection device comprises a bypass line configured to connect the bypass opening with the pressure source, wherein the bypass line has a flow resistance which is at least ten times lower than the inflow resistance, and wherein the detection device comprises a bypass valve configured to reversibly interrupt an inflow of the detection fluid via the bypass opening;
   an inflow resistance to limit an inflow of the detection fluid via the inflow opening;
   at least one outflow resistance to limit an outflow of the detection fluid via the at least one outflow opening, and
   a pressure sensor to determine a pressure of the detection fluid in the measuring chamber; and
  a contact body to clamp with the object, wherein the at least one detection opening is arranged on the contact body; and
 a drive device to displace the contact body in relation to the machine frame, wherein the measuring chamber is formed by a basic housing and a clamping housing which is displaceable in relation to the basic housing, and wherein the at least one outflow resistance is formed by a labyrinth seal in a bearing gap between the basic housing and the clamping housing.

11. A process for the seating detection of an object on a clamping device, the process comprising the steps of:
 providing a detection device for seating detection of an object on a clamping device, the detection device comprising:
  a measuring chamber with an inflow opening to supply a detection fluid from a pressure source into the measuring chamber, at least one outflow opening to discharge the detection fluid from the measuring chamber to a pressure sink, at least one detection opening, which is at least partially closable by the object abutting on the clamping device and a bypass opening to supply the detection fluid from the pressure source into the measuring chamber, wherein the detection device comprises a bypass line configured to connect the bypass opening with the pressure source, wherein the bypass line has a flow resistance which is at least ten times lower than the inflow resistance, and wherein the detection device comprises a bypass valve configured to reversibly interrupt an inflow of the detection fluid via the bypass opening;
  an inflow resistance to limit an inflow of the detection fluid via the inflow opening;
  at least one outflow resistance to limit an outflow of the detection fluid via the at least one outflow opening, and a pressure sensor to determine a pressure of the detection fluid in the measuring chamber determining the pressure of the detection fluid in the measuring chamber by means of the pressure sensor, wherein during the determining of the pressure the detection fluid continuously flows out of the measuring chamber via the at least one outflow opening; and determining a state of positioning on the basis of the pressure.

12. The process according to claim 11, further comprising displacing the at least one detection opening in relation to the inflow opening during the determining of the pressure.

13. The process according to claim 11, further comprising determining a state of positioning in dependence on at least one of a measuring temperature and a relative movement between the detection opening and the inflow opening.

14. The process according to claim 11, further comprising adjusting the at least one outflow resistance depending on at least one of a measuring temperature and a relative movement between the detection opening and the inflow opening.

15. The process according to claim 11, further comprising a filling of the measuring chamber with the detection fluid via a bypass line, closing the bypass line and determining the pressure when the bypass line is closed.

16. The process according to claim 11, wherein the determination of the state of positioning is carried out during a pressure change within the measuring chamber.

17. The process according to claim 11, wherein a portion of the bypass line extends between the pressure source and the measuring chamber and another portion of the bypass line extends between the measuring chamber and the pressure sink.

18. The machine tool according to claim 10, wherein a portion of the bypass line extends between the pressure source and the measuring chamber and another portion of the bypass line extends between the measuring chamber and the pressure sink.

19. The clamping device according to claim 9, wherein a portion of the bypass line extends between the pressure source and the measuring chamber and another portion of the bypass line extends between the measuring chamber and the pressure sink.

20. The detection device according to claim 1, wherein a portion of the bypass line extends between the pressure source and the measuring chamber and another portion of the bypass line extends between the measuring chamber and the pressure sink.

* * * * *